June 16, 1931.  A. L. SCHOFF ET AL  1,810,406

PROCESS AND MEANS FOR MAKING CUSHION TIRES

Filed May 26, 1927   3 Sheets-Sheet 1

Inventors
ALBERT L. SCHOFF
EDWARD NELSON
GEORGE NELSON

By their Attorney

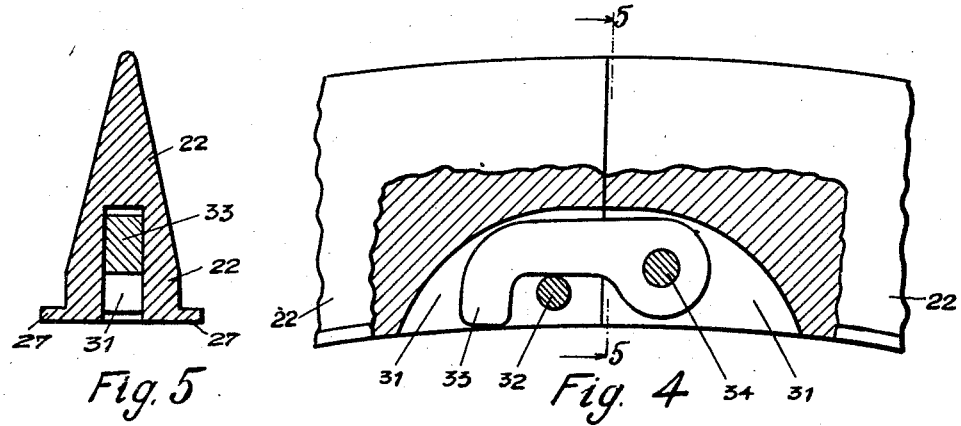
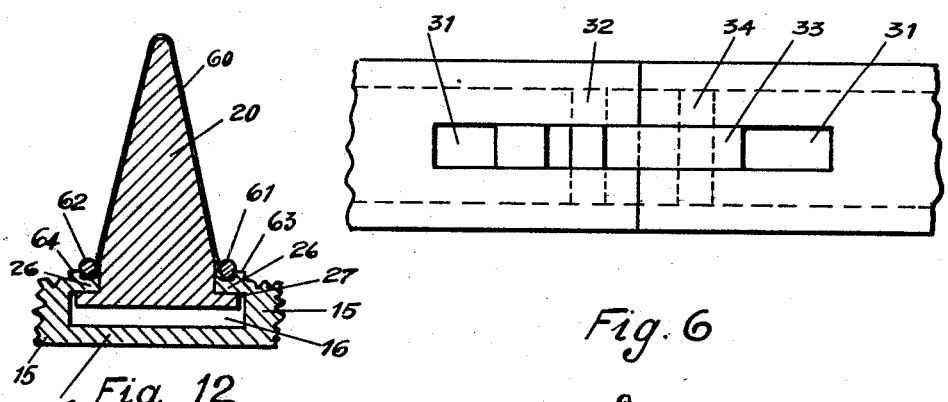
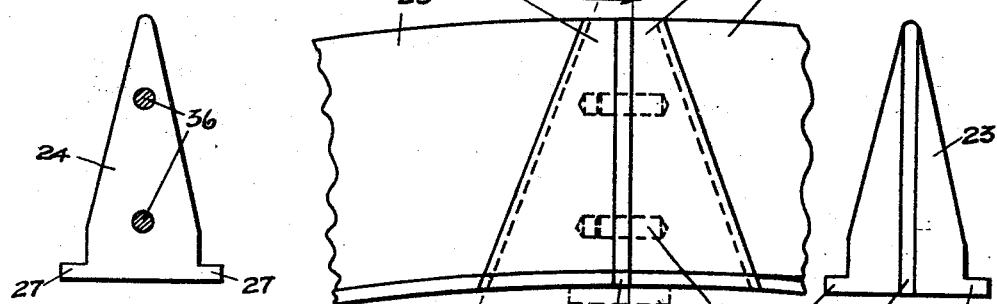

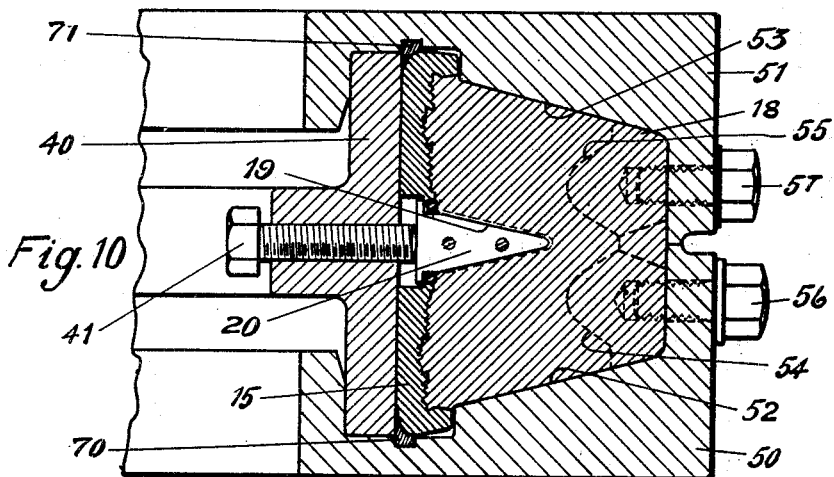
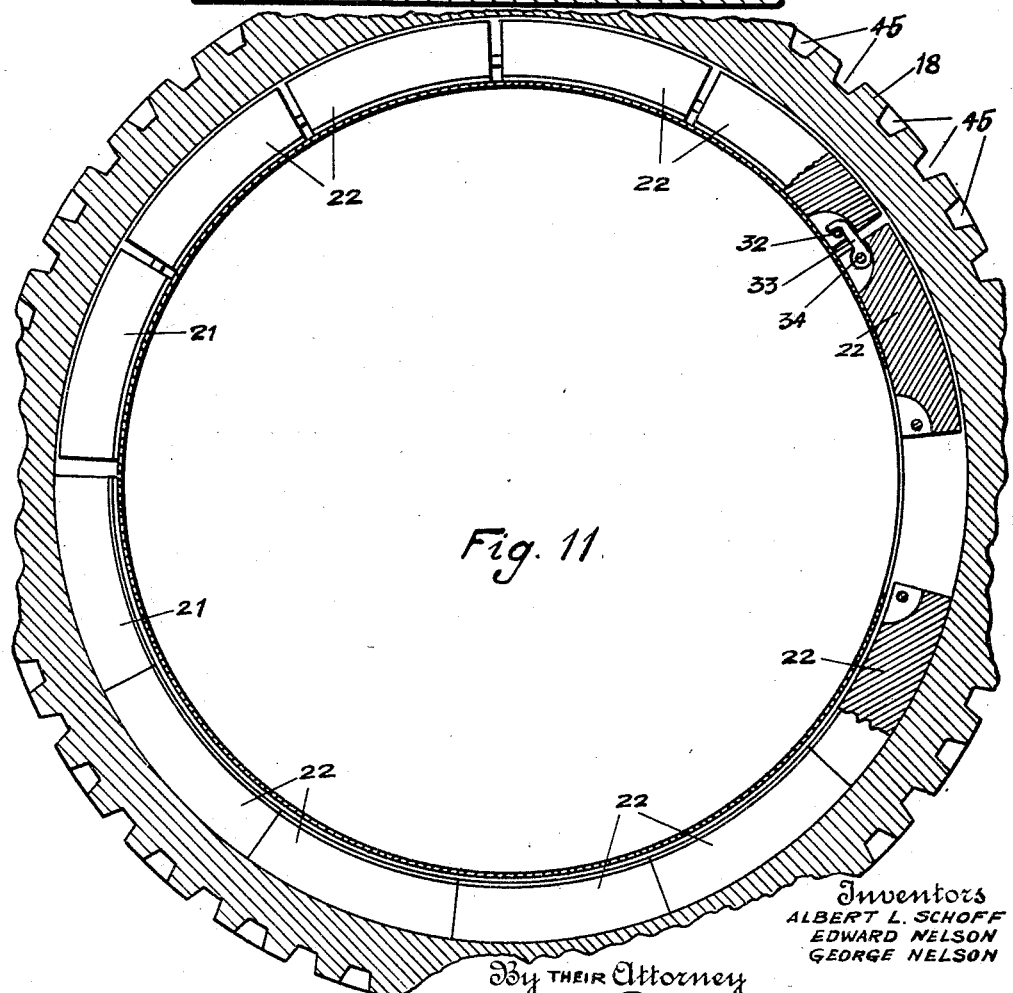

Patented June 16, 1931

1,810,406

UNITED STATES PATENT OFFICE

ALBERT L. SCHOFF, OF CALDWELL, AND EDWARD NELSON AND GEORGE J. NELSON, OF BELLEVILLE, NEW JERSEY, ASSIGNORS TO OVERMAN CUSHION TIRE COMPANY, INC., OF NEW YORK, N. Y., A CORPORATION OF NEW YORK

PROCESS AND MEANS FOR MAKING CUSHION TIRES

Application filed May 26, 1927. Serial No. 194,362.

Figures 1, 3:
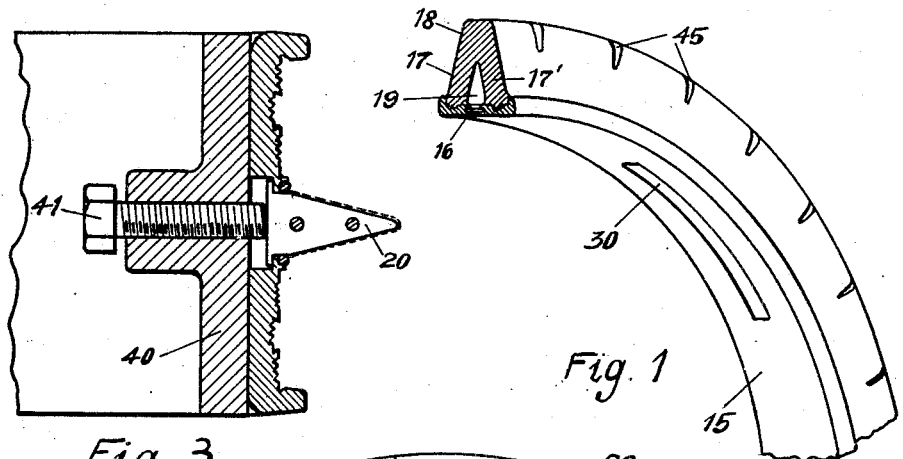

Our invention relates to an improved process and means for making vehicle cushion tires of the type having a unitary metal base band permanently vulcanized to an annular rubber body containing an annular cavity therein, such, for instance, as the tire illustrated in Fig. 1 of the annexed drawings.

The main objects of the invention are to reduce the cost and improve the product in the manufacture of tires, such as that shown in Fig. 1, in which the rubber body of the tire is not only provided with a relatively high and narrow internal annular cavity, but also has deep tread recesses formed in its outer periphery during the compressive molding and vulcanizing of the tire on the base band, and without displacing or deforming the internal cavity, while at the same time enabling the cavity forming core to be removed through the base band, after the tire is otherwise completed, without seriously weakening or reducing the wheel gripping surface of the said permanently united base band.

It has heretofore been found necessary in manufacturing cushion tires such as that above described, to either (a)—almost bisect the base band in line with the cavity by a series of elongated slots separated by narrow tie pieces or bridges in order to enable each rigid arcuate metallic sector of such a type of cavity forming core to be separately withdrawn through its slot in the base band after the tire has been vulcanized, or (b)—to make the core of material that could be fused, dissolved or fractured into bits, in-situ, to enable its removal through one or more small orifices provided therefor in the base band. A valuable feature of a core formed of permanent rigid metal sectors such as referred to in (a) above, is the resistance of it to fracture, deformation and displacement under the heavy localized pressures that occur in molding such tires, and especially those having deep tread recesses in their outer periphery, but the accompanying series of elongated slots in the base band that have heretofore been necessary for the removal of such rigid sectors after the tire is completed have not only greatly weakened the base band but also appreciably decreased the gripping surface of its interior periphery by which the said band carrying the said tire is secured to a vehicle wheel by being forcibly pressed thereon. On the other hand, the insignificant weakening of the base band and decrease of its gripping surface caused by the small apertures therethrough for removing a fusible soluble or fragile core make such a core ideal so far as the strength and gripping surface of the base band are concerned, but otherwise defective either on account of the excessive expense of wastage of the core material in forming and removing the cores, or on account of the impaired accuracy of form and position of the cored cavities arising from the inherent weakness and instability of such cores under the heavy localized molding pressures. It is our aim, therefore, to secure through our invention the advantages in accuracy and reduced expense incident to the use of permanently formed rigid metallic core sectors, while at the same time avoiding the excessive impairment of the strength and gripping surface of the base band which has heretofore accompanied their use in the manufacture of such tires.

With these and other objects in view, as more fully set forth hereinafter, our invention consists of the novel process and means herein described and claimed, it being understood that while we have for convenience illustrated the preferred form of our invention, we do not limit ourselves to such preferred form.

Figure 2:
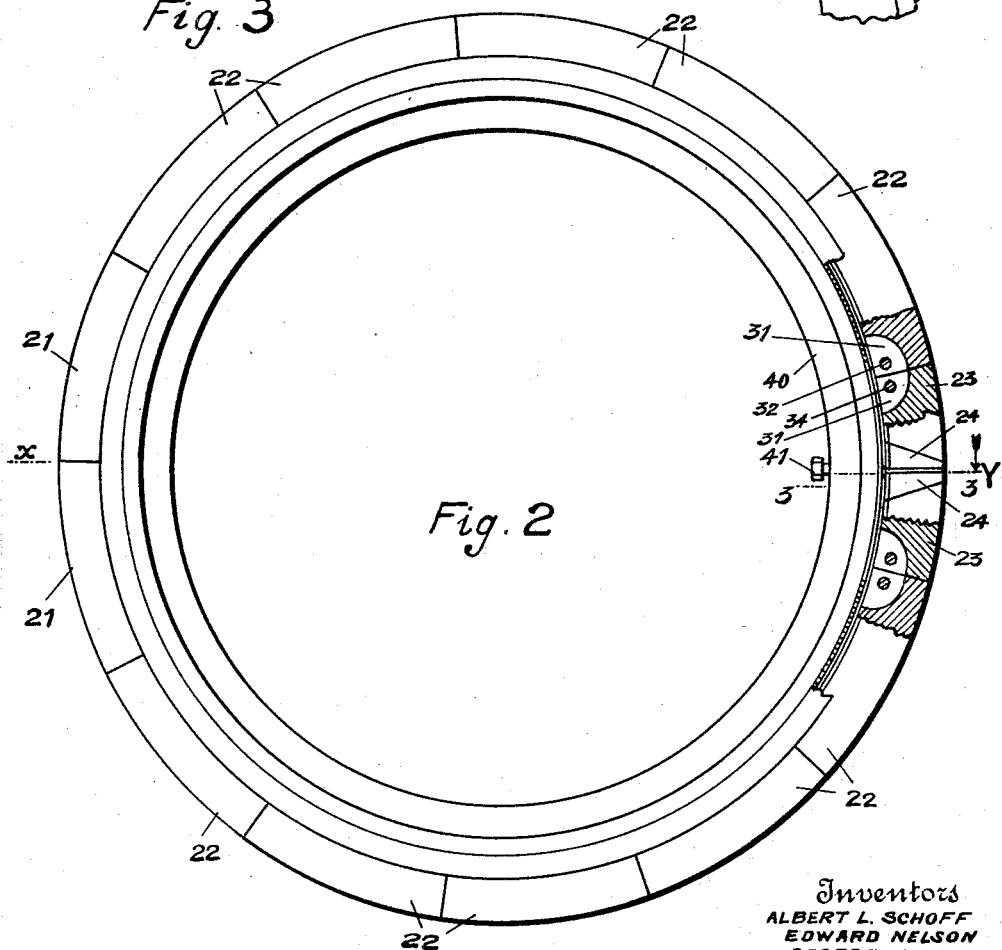

Referring now to the drawings: Fig. 1 is a perspective view, partly in section, of a portion of a finished hollow cushion tire having a metallic base band permanently united to the rubber body and made in accordance with the present invention; Fig. 2 is a plan view, partly in section, of the metallic base band with a complete annular ring of cavity forming core sectors and their locking devices assembled thereon; Fig. 3 is a transverse section through Fig. 2 on the line 3—3, looking in the direction of the arrow; Figs. 4 to 9 are detail views hereinafter more fully described, of the core sectors of Fig. 2 on an enlarged scale; Fig. 10 is a cross section, similar to Fig. 3, after the rubber body of the tire has been built up on the base band and the whole tire and core structure enclosed in a compression mold and vulcanized; Fig. 11 is a plan view, parly in section, through the completed tire of Fig. 10 after the mold and a portion of the core sectors have been removed; and Fig. 12 is a cross section through a core sector and a fragment of the base band and is hereinafter more fully described.

Applying similar reference characters to the same or corresponding parts in all of the views, the cushion tire shown in Fig. 1 and 10 comprises a unitary annular, metal base band 15 similar to those of the well known standard type for solid tires except that the said band is here provided with a specially formed centrally located circumferential groove 16 in its outer peripheral surface, the remaining portion of said outer peripheral surface being tongued and grooved in the usual manner and having permanently secured to it by vulcanization the annular rubber body of the tire embodying the two similar laterally inclined annular side walls 17—17' and integrally united nose portion 18 which with the base band 15 enclose the annular cavity 19. In Fig. 10 the cavity 19 is shown as containing the cavity forming core which is of wedge shape in cross section and is indicated generally by the numeral 20. Said cavity forming core 20, as shown more clearly in Fig. 2, comprises two similar semicircular core assemblies each of which extends half way around the base band from the point x to the point y and each is made up of a plurality of rigid metal sectors abutted serially against each other. Each semicircular assembly camprises one core sector such as 21, 5 sectors such as 22, one sector such as 23 and a wedging sector member such as 24. The central groove 16 in the base band 15 is undercut, as more clearly shown in Fig. 12, to provide the two over-hanging ledges 26, and each of the sectors of the core 20 is provided with corresponding flanges 27 which engage the two ledges 26 when the core 20 is pushed radially outward in the said groove 16. Each of the sectors 21 and 22 of core 20 are of the same length, while the sectors 23 and the wedge sectors 24 are much shorter as hereinafter explained. The groove 16 in the base band 15 is of uniform radial depth and much deeper than the thickness of the flanges 27 on the sectors of core 20, but the strip of metal 15a of the base band 15 at the bottom of the groove is left sufficiently thick to prevent unduly impairing the strength of the base band at this point. The ledges 26 overhanging the groove 16 are also continuous circumferentially, but the base band is perforated through the metal 15a at one point by an elongated slot 30 which is the full width of the undercut groove 16 and has an arcuate length slightly greater than that of the sectors 21 and 22, so that each of these sectors may be radially inserted through the said slot 30 into the groove 16. Each of the sectors 22, as more clearly shown in Figs. 4, 5 and 6, is provided in each end with a slot 31, and in the slot in one end is a cross-pin 32, and in the slot in the other end is a hook 33 pivoted therein by means of a cross pin 34, the said pivoted hook 33 and cross pin 32 serving to loosely hook the two sectors together as shown in Fig. 4. Each of the sectors 21 may be an exact duplicate of the sectors 22, except that where the two sectors 21 abut against each other at the point X, they are not to be hooked together, and, therefore, they can be either left plain at these ends without any slot 31 in them, or the hook 33 can merely be omitted from them. The two short sectors 23, and the two wedging sectors 24 have a combined length equal to one of the sectors 22, and one end of each of the sectors 23 is provided with a slot 31 and pin 34 in Fig. 2. The other end of each of the sectors 23 is beveled as shown more clearly in Fig. 7, and is provided with a centrally located radially extending tongue 35. Similarly one end of the wedging sectors 24, is beveled to correspond with that of sector 23, and has a centrally located radially extending groove into which the tongue 35 of the sector 23 fits. The two sectors 24 are provided with co-operating dowel pins 36, and holes therefor, as shown in Fig. 7, and the said sectors 24 are separated by a filler piece or shim 37, of the same shape as the core sectors and perforated for the dowel pin 36 to pass through it.

Referring to Fig. 2, it will be noted that with each of the semi-circular core assemblies arranged in closely abutted relation, as there shown, any radially outward pressure exerted on the wedge sectors 24 will put a compressive stress in each of the said sectors and cause each of them to try to move radially outward away from the base band 15. However, since the sectors are prevented by their flanges 27, co-acting with the ledges 26 of the groove 16, from moving radially outward, the entire annular core becomes a rigid circular arch not only capable of resisting heavy radial compressive force exerted against it from forcing it down into groove 16, but the co-operating flanges 27 of the sectors and the ledges 26 of the groove also prevent each of the sectors from being tipped over laterally in the groove. Under these conditions the said core 20 when thus compressively assembled by means of the wedging sectors 24, is not only radially held in a concentric position with respect to the base band, but each of these sectors being made of rigid metal is thoroughly capable of withstanding the heaviest molding stresses, either locally concentrated or otherwise, that may come upon it. In order to actuate the wedging sectors 24 radially outward to wedge the whole core into a rigid annular ring as above described, the mold base ring 40 that just fits the interior periphery of the base band 15 is placed therein, as shown in Figs. 2, 3 and 10 and this mold ring is provided with a thrust screw 41 threaded through it with the end of the said screw 41 abutting either directly against the two wedge sectors 24 or against the thrust plate 42, shown in dotted line at the bottom of Fig. 7, which may be used if desired in order to better distribute the pressure of the screw between the two wedge sectors 24. In order to adapt the length of the core to meet reasonable variations in the diameter of the under-side of the over-hanging ledges 26 in different base bands, the shim 37 may be varied in thickness as required.

As previously stated, and as shown in Figs. 1, 10, and 11, the nose portion 18 of the rubber body of the tire has formed in its outer periphery a series of laterally alternating, circumferentially spaced, exteriorly open recesses 45 which extend laterally across the said nose from their respective edges to slightly beyond the center and radially deeply into the said nose portion 18. In the manufacture of tires having both an interior circumferentially extending cavity and a series of radially deep, circumferentially spaced, outer recesses, as above described, it is desirable and generally necessary to form these exterior recesses in the body of the tire during the molding of the said body with the core for the interior cavity in place. A well known form of mold for forming such exterior recesses in the body of a hollow tire is illustrated in a general way in cross-section Fig. 10, and is more fully shown and described in Overman U. S. Patent #1,223,726 granted April 24, 1917. Such a mold, as regards this feature, may be briefly described as comprising the two similar circular disks or side rings 50 and 51, in the proximate faces of which annular recesses 52 and 53 respectively are formed, each having the shape of one-half of the exterior surface of the tire and each provided with a series of circumferentially spaced fingers or inserts 54 and 55 respectively, suitably and detachably connected to their respective side rings by bolts 56 and 57 respectively, and in laterally staggered relation to each other. These fingers or inserts 54 and 55 mash into the body of the tire as the two halves of the mold are forcibly enclosed together, and thus form the external open tread recesses 45 in the tire. It will be readily seen that the forming of such deep recesses 45 in the body of the tire produce, during the molding process, exceedingly high localized pressures in the plastic body of the rubber at the points where these recesses are located, and that consequently the core for maintaining the size and shape of the central cavity 19 in the tire is subject to exceedingly high localized deforming pressures therefrom. It is furthermore seen that with a very thin wedge shaped core, such as is here illustrated and which we find from long experience produces a superior tire, the thin V-shaped nose of the core is subjected to such severe localized bending stresses by the tread recess forming fingers mashing through the rubber body in the molding operation that these cores must not only be made of a very strong material but must also be very securely anchored to the base band against lateral displacement and deflection with respect thereto. It will furthermore be seen that in order to remove the core 20, as hereinafter described, it is necessary to prevent the body forming rubber, while it is in a highly plastic condition during the molding and earlier portion of the vulcanizing operations, from being squeezed or intruded into the sector joints of the core and also through the joints between the core and the groove 16 and into the slot 30. After the core has been assembled on the base band as shown in Fig. 2, a strip of suitable material such as fabric cut on the bias is stretched entirely around the core 20, and down along its sloping edges, and slightly overlapping on to the outer periphery of the ledges 26. The method of application of this fabric is shown in Fig. 12. The said fabric 60 extends completely around the periphery of the core 20 to entirely enclose all joints in the said core, and is held down against the ledges 26 by the two circumferentially continuous cords or bands 61 and 62 which in turn are prevented from moving laterally outward away from the core by the small beads 63 and 64 formed on the outer periphery of the base band 15. These bands 61 and 62 may be made of vulcanized rubber or other suitable material tightly stretched around to hold the edges of the fabric 60 tightly stretched down against the core and into the groove between the core 20 and the beads 63 and 64, so as to prevent the highly plastic rubber in the molding and vulcanizing operations from being squeezed down under the fabric. The said fabric 60 may be impregnated or otherwise treated with rubber compound or other suitable frictioning material before being used, in order to make it impervious to the plastic rubber in the molding and vulcanizing operation.

Owing to the fact that the base band 15, as a commercial article, will vary more or less in width, and since it is important to prevent the rubber that is in the mold from being squeezed out therefrom by the heavy pressures generated in it during the molding and vulcanizing operations on it, we find it advantageous, as shown in Fig. 10, to provide rubber or other dams or packing rings 70 and 71, respectively which are annularly continuous and each of which is set into an annular recess formed therefor in its respective side of the mold ring members 50 and 51 respectively, the said packing rings being of such shape and thickness as to tightly squeeze into the openings between the rounded conners at the edges of the base band 15 and the outer periphery of the mold base ring 40. While, therefore, a small amount of the plastic body of rubber may be squeezed between the mold rings and the lateral edges of the base band, these packing rings 70 and 71 will stop it at this point, and not only prevent the waste of rubber which would otherwise occur, but also insure the maintenance of the proper pressure during the vulcanizing operation.

With the metal base band 15 especially prepared for use with our special core by having formed in it the centrally located groove 16 with the over-hanging ledges 26 and with the elongated slot 30 also formed therein, the core 20 may be readily assembled on it into the position shown in Fig. 2. In performing such an assembly, we find it convenient to stand the base band up vertically with the slot 30 at the top and with the base band resting on a table or bench over a slot in the latter that is wide enough and deep enough to permit the core sectors to clear the said bench when they are in position on the band, and then proceed by first inserting one of the core sectors 21 radially outward through the slot until its flanges 27 come in contact with the ledges 26 and then push the said sector 21 around in the groove 16 until its end that carries the crosspin 32 is near the end of the slot. We then present one of the sectors 22 in a perpendicular direction to the sector and latch the hook 33 over the pin 32 at the same time rotating the sector 22 around and radially outward until we have it fully through the slot 30, and we then push it and the sector 21 on around in the groove 16 until the upper end of the sector 22 is near the end of the slot, when we continue by hooking another sector 22 to the former one in the same way that is just described, and continue until all of the five sectors 22 have been assembled. We then proceed in a similar manner with the other half of the core. We then push each of the two sectors 23 up through the slot 30 and abut them respectively against the two upper sectors 22 and, then apply the wedging sectors 24 through the slot 30 and push them out until we find how thick a shim is needed between the two sectors 24 to enable them to wedge the two halves of the ring into a rigid circular column in the slot 16 with the flanges 27 exerting an outward thrust against the ledges 26. We then remove the wedge sectors 24 and after applying such a shim 37 between them we replace them in the position shown in Fig. 2. We then apply the mold base ring 40 to the inner periphery of the base band 15 and screw the thrust screw 41 outwardly and force the wedge sectors 24 outwardly into circumferential alignment with the other sectors and the whole core into a rigid circumferentially continuous circular arch held concentric with the said base band 15 by the interaction of the flanges 27 and ledges 26. We then wind a strip of a suitable bias-cut fabric over the entire outer periphery and sides of the core 20 and pull it down smoothly along the edges and secure it by means of the cords or bands 61 and 62 as shown in Fig. 12, the two ends of the fabric being lapped slightly over each other to form a complete covering for the core and the outer end being preferably taped with adhesive tape to secure a tighter joint between the over-lapping ends. We then proceed to build up the tire body of rubber compound either by winding it on in layers, or by extruding it to form and applying and joining a suitable length of it into a ring of the proper shape and size, to form the completed body when properly molded. We then apply the two halves 50 and 51 of the mold to the tire body in its assembled position on the base band, core, and mold-base ring, and press the two faces of the mold forcibly together by means of a suitable press, forcing the tread recess forming fingers 54 and 55 laterally into the said tire body until the mold is completely closed with the said tire body forcibly compressed therein. We then proceed to vulcanize the tire in the mold in the usual manner in a vulcanizing oven. When the vulcanizing is completed, the bolts 56 and 57 are then removed leaving the recess forming fingers 54 and 55 in the tire, and these are then removed by pulling them radially outward, and the thrust screw 41 is released and the mold base ring 40 removed from the interior of the base band 15. We then locally apply compressive force to the outer periphery of the tire, either by hammering it, rolling it or otherwise, to cause first the wedge sectors 24 to move radially inward into the slot 30 from which they are pulled inward and away from the base band, and then the two short sectors 23 to also move into the said slot where they are also pulled inward away from the base band. The hammering or rolling of the tire is then continued, if necessary, until the remaining sectors 21 and 22 have been pushed radially inward to the bottom of the groove 16 and free of the inside surfaces of the tire cavity as shown in the upper portion of Fig. 11. We then use either a small pry bar or hook to force or pull the five sectors 22 and the one sector 21 of one half of the core around in the cavity until each in succession is brought into radial alignment with the slot 30 through which it is rotated and unhooked from the next following sector. A hook or pry bar may also be used on pin 34 of the sector 23 if necessary, in extracting it. Similarly we proceed to extract the remaining sectors of the other half of the core until the entire cavity has been freed of the core, and the tire is thus completed and ready for use with an accurately formed and positioned annular cavity and equipped with a permanently united unitary metallic base band that has been weakened to a minimum extent in connection with the removal through it of the plurality of permanently formed arcuate core sectors and whose interior peripheral surface for constrictively gripping a vehicle wheel when forcibly pressed thereon has been reduced only by the amount of area represented by the single slot 30.

Claims:

1. The method of making a cushion tire, which comprises assembling a sectional annular core about a one-piece base-band, molding a rubber-composition tire-body against the core and base-band and vulcanizing it to the base-band, causing an inward movement of the molding surface of the core to separate it from the inner surface of the tire-body and then moving the core sections lengthwise in the cavity formed by the core, to a point of withdrawal.

2. The method of making a cushion tire, which comprises assembling core sectors about a one-piece base-band, molding a rubber-composition tire-body against the core and base-band, moving the core sectors radially inward to free their molding surfaces from the inner surface of the tire-body and then moving the core sectors lengthwise in the cavity formed by the core, to a point of withdrawal.

3. The method of making a cushion tire, which comprises so mounting an annular core consisting of undeformable sections on a one-piece base-band as to enclose a free space adjacent to each piece of the core, molding a rubber-composition tire-body against the core and base-band and vulcanizing it to the base-band, moving the core pieces into said free space, and then moving them lengthwise in the cavity formed by the core, to a point of withdrawal.

4. The method of making a cushion tire, which comprises so mounting a sectional annular core on a one-piece base-band as to enclose a free annular space between the core and the outer surface of the base-band, molding a rubber-composition tire-body against the core and base-band and vulcanizing it to the base-band while excluding the rubber from said free space, moving the sections of the core into said free space to draw their molding surfaces away from the inner surface of the tire body, and then moving the core sections lengthwise in the cavity formed by the core, to a point of withdrawal.

5. The method of making a vulcanized-on hollow cushion tire, which comprises forming an undercut groove in the outer periphery of a metal base-band, mounting flanged core sections in said groove to form an annular core, circumferentially expanding said core to draw the flanges of the sections against the over-hanging edges of said groove, molding a rubber-composition tire-body against the core and base-band and vulcanizing it to the base-band, permitting the core to contract to allow the flanges of the core sections to move radially inward in said groove and the molding surface of the sections to move away from the inner surface of the tire-body, and then moving the core sections lengthwise in the groove and the cavity formed by the core, to a point of withdrawal.

6. Apparatus for manufacturing a hollow vulcanized-on cushion tire, comprising a one-piece metal ring adapted to form a tire-base, an annular core surrounding the outer periphery of said ring and consisting of separate undeformable pieces, the ring and the core pieces being formed to provide a free space adjacent to each core piece into which said core piece is movable, and removable means for preventing the core pieces from moving into said free space during the molding of a tire body against the core and ring.

7. Apparatus for manufacturing a hollow vulcanized-on cushion tire, comprising a metal ring adapted to form the base-band of the tire, a sectional annular core surrounding the ring, and removable means for spacing the inner periphery of the core radially outward from the portion of the peripheral surface of the ring which lies directly under under it, and means enclosing the space between the inner surface of the core and the periphery of the ring to exclude rubber therefrom when a tire body is molded against the core and the ring.

8. Apparatus for manufacturing a hollow vulcanized-on cushion tire, comprising a metal ring adapted to form the base-band of slot, an annular core surrounding the base-band and consisting of sectors each having a length less than that of said slot, removable means for spacing the inner periphery of the core radially outward from the portion of the peripheral surface of the base-band which lies directly under it, and means enclosing the space between the inner surface of the core and the periphery of the base-band to exclude rubber therefrom when a tire-body is molded against the core and the base-band.

9. Apparatus for making a vulcanized-on hollow cushion tire, comprising a metal ring adapted to form the base-band of the tire and containing a circumferential groove in its outer periphery, a sectional annular core mounted in said groove, removable means for spacing the inner surface of the core radially outward from the bottom surface of the groove, and means for excluding rubber from said groove during the molding of a tire-body against the core and base-band.

10. Apparatus for making a vulcanized-on cushion tire, comprising a metal base-band containing a circumferential groove in its outer periphery and a slot extending through it from a portion of said groove, an annular core mounted in said groove and consisting of sectors each having a length less than the length of said slot, removable means for spacing the inner surface of the core radially outward from the bottom surface of the groove and means for excluding rubber from said groove during the molding of a tire body against the core and base-band.

11. Apparatus for manufacturing a hollow vulcanized-on cushion tire, comprising a metal base-band containing a longitudinal slot, an annular core surrounding the base-band and consisting of sectors each having a length less than that of said slot, means for expanding said core circumferentially to space its inner periphery radially outward from the portion of the peripheral surface of the base-band which lies directly under it, and interlocking means formed on the core and on the base-band to limit such outward movement of the core.

12. Apparatus for making a vulcanized-on cushion tire, comprising a metal ring adapted to form the base-band of the tire and containing a circumferential groove in its outer periphery, a sectional annular core mounted in said groove, means for expanding said core circumferentially to space it radially outward from the bottom surface of the groove, and interlocking means formed on the core at its inner edge and on the base-band at the edge of said groove for limiting such outward movement of the core.

13. Apparatus for making a hollow vulcanized-on cushion tire, comprising a sectional annular core having lateral flanges, a metal base-band having in its outer periphery an undercut circumferential groove under the overhanging edges of which the lateral flanges of the core fit loosely and having an opening through which the core sections may be withdrawn from said groove, and means for expanding said core circumferentially to force said lateral flanges against the over-hanging edges of the groove.

14. Apparatus for making a hollow vulcanized-on cushion tire, comprising a metal base-band having an undercut circumferential groove in its outer periphery and a longitudinal slot registering with a part of said groove, an annular core consisting of arcuate core sections having lateral flanges fitting loosely in said groove under the over-hanging edges thereof and each of a length less than that of the slot, and means for expanding said core circumferentially to force said lateral flanges against the over-hanging edges of the groove.

15. Apparatus for making a hollow vulcanized-on cushion tire, comprising a metal base-band having an undercut circumferential groove in its outer periphery and a longitudinal slot registering with a part of said groove, an annular core consisting of arcuate core sections having lateral flanges fitting loosely in said groove under the over-hanging edges thereof and each of a length less than that of the slot, and means insertible through said slot for expanding said core circumferentially.

16. Apparatus for making tires, comprising a metal base-band having an undercut circumferential groove and containing a hole extending from the bottom of said grove to the inner surface of the base-band, and an annular core removable through said hole and having at its base lateral projections lying under the over-hanging edges of said groove.

17. Apparatus for manufacturing a hollow vulcanized-on cushion tire, comprising a metal base-band containing a longitudinal slot, an annular core surrounding the base-band and consisting of linked sectors each having a length less than that of said slot, removable means for spacing the inner periphery of the core radially outward from the portion of the peripheral surface of the base-band which lies directly under it, and means enclosing the space between the inner surface of the core and the periphery of the base-band to exclude rubber therefrom when a tire body is molded against the core and base-band.

18. Apparatus for manufacturing a hollow vulcanized-on cushion tire, comprising a metal base-band containing a longitudinal slot, and an annular core surrounding the base-band and consisting of two unconnected sets of linked sectors extending in opposite directions from the slot and meeting at a point remote therefrom.

19. Apparatus for manufacturing a hollow vulcanized-on cushion tire, comprising a metal base-band containing a longitudinal slot, and an annular core surrounding the base-band and consisting of two unconnected sets of linked sectors extending in opposite directions from the slot and meeting at a point diametrically opposite to the slot.

20. Apparatus for manufacturing a hollow vulcanized-on cushion tire, comprising a metal base-band containing a longitudinal slot, an annular core surrounding the base-band and consisting of two unconnected sets of linked sectors extending in opposite directions from the slot and meeting at a point remote therefrom, removable means for spacing the inner periphery of the core radially outward from the portion of the peripheral surface of the base-band which lies directly under it, and means enclosing the space between the inner surface of the core and the periphery of the base-band to exclude rubber therefrom when the tire body is molded against the core and base-band.

21. Apparatus for use in molding tire cavities comprising two abutting arcuate core sections having longitudinal recesses in the lower portions of their adjacent ends, a fixed transverse pin extending across each such recess, and a link lying in the recesses and connecting the pins and engaging one of them loosely to permit a limited separation of the abutted sections.

22. Apparatus for use in molding tire cavities, comprising two abutting arcuate core sections having longitudinal recesses in the lower portions of their adjacent ends, a transverse pin extending across each such recess, and a hook lying in recesses pivoted on one pin and releasably engaging the other, the hook being formed to permit approaching movement of the ends of the sections and to prevent further separating movement after the ends of the sections have been slightly separated.

23. Apparatus for manufacturing a hollow vulcanized-on cushion tire, comprising a one-piece metal ring adapted to form a tire-base, an annular core surrounding the outer periphery of said ring and consisting of separate undeformable pieces, the ring and the core pieces being formed to provide an unoccupied space adjacent to each core piece into which said core piece is movable, removable means for preventing the core pieces from moving into said unoccupied space during the molding of a tire body against the core and ring and a flexible cover on said core to exclude rubber from said unoccupied space during such molding.

24. Apparatus for manufacturing a hollow vulcanized-on cushion tire, comprising a one-piece metal ring adapted to form a tire-base, an annular core surrounding the outer periphery of said ring and consisting of separate pieces, the ring and the core pieces being formed to provide an unoccupied space adjacent to each core piece into which said core piece is movable, removable means for preventing the core pieces from moving into said unoccupied space during the molding of a tire body against the core and ring, a pair of cords tightly surrounding the base-band adjacent to each side of the core, and a flexible cover extending over the core and having its edges secured by said cords.

25. Apparatus for making a vulcanized-on cushion tire, comprising a metal ring adapted to form the base-band of the tire and containing a circumferential groove in its outer periphery, a sectional annular core mounted in said groove, removable means for spacing the inner surface of the core radially outward from the bottom surface of said groove, a covering of flexible material for said core, and means for holding the edges of said covering tightly against the base-band at each side of said groove to exclude rubber from said groove during the molding of a tire body against the core and base-band.

26. Apparatus for making a hollow vulcanized-on cushion tire, comprising a sectional annular core having lateral flanges, a metal base-band having in its outer periphery an undercut circumferential groove under the overhanging edges of which the lateral flanges of the core fit loosely and having an opening through which the core sections may be withdrawn from said groove, means for extending said core circumferentially to force said lateral flanges against the over-hanging edges of the groove, a flexible covering for said core, and means for holding the edges of said covering tightly against the base-band at each side of the groove.

27. A cushion tire base-band, consisting of a metal ring containing in its outer periphery, in addition to the usual tongues and grooves for bonding the rubber, a deeper undercut circumferential groove and having a hole extending through it from the bottom of said groove to the inner surface of the ring.

28. A base-band for a cushion tire, comprising a metal ring having in its outer periphery, in addition to the usual tongues and grooves for bonding the rubber, a deeper centrally located circumferential groove and containing a longitudinal slot having a length greater than the width of the groove and extending from a portion of the bottom of said groove to the inner side of the ring.

29. A base-band for a cushion tire, comprising a metal ring having in its outer periphery a circumferential groove with overhanging side flanges and containing a longitudinal slot extending from a portion of the bottom of said groove to the inner side of the ring and of a width greater than the distance between the opposite side flanges of the groove.

Signed at New York in the county of New York and State of New York this 23d day of May A. D. 1927.

ALBERT L. SCHOFF.

Signed at Belleville in the county of Essex and State of New Jersey, this 24 day of May, 1927.

EDWARD NELSON.
GEORGE J. NELSON.